United States Patent Office 2,983,709
Patented May 9, 1961

2,983,709

POLY-α-OLEFINS CONTAINING SYNERGISTIC STABILIZER COMBINATION OF RESORCINOL MONOBENZOATE AND 2,2'-METHYLENE BIS-(6-TERTIARY BUTYL-P-CRESOL)

Gordon C. Newland and John W. Tamblyn, Kingsport, Tenn., assignors to Eastman Kodak Company, Rochester, N.Y., a corporation of New Jersey No Drawing. Filed May 20, 1959, Ser. No. 814,393

5 Claims. (Cl. 260—45.85)

This invention relates to the stabilization of poly-α-olefin compositions. Preferred embodiments of the invention relate to the stabilization of polyethylene and polypropylene compositions against deterioration resulting from exposure to sunlight or ultraviolet light with a novel synergistic combination of stabilizers.

Poly-α-olefins such as polyethylene, polypropylene and the like are subject to photo-oxidation when exposed to sunlight. This oxidation is characterized in its earlier stages by the breaking of the polymer chain and the formation of carbonyl groups in the polymer's molecule. As the oxidation continues, the polymer cracks and loses tensile strength to the point of mechanical failure. A number of so-called ultraviolet inhibitors are known which inhibit the photo-degradation of many polymers, resins or plastics. However, many effective stabilizers for halogen-containing polymers such as polyvinyl chloride, polyvinylidene chloride and the like are not effective stabilizers in poly-α-olefins, as stabilizers in halogen-containing polymers function essentially as hydrogen halide scavengers while stabilizers in halogen-free poly-α-olefins do not serve this function. Likewise, ultraviolet inhibitors which are eminently suited for such cellulosic esters as cellulose triacetate, cellulose acetate butyrate and the like are not necessarily effective ultraviolet inhibitors for poly-α-olefins. Hence, it is highly unpredictable as to whether a given ultraviolet inhibitor compound will be effective in poly-α-olefin compositions.

At least as unpredictable is the determination of whether or not a given combination of two or more stabilizer compounds will synergize to produce a stabilizing effect in poly-α-olefins that is greater than the additive effect of the individual stabilizers. We know of no method whereby a combination of stabilizers can be predicted to the synergistic stabilizers for poly-α-olefin compositions short of actually testing the combination in a poly-α-olefin composition, even though the individual components comprising the combination may be well-known stabilizers for various polymers, resins or plastics including poly-α-olefin compositions.

Apart from the fact that it is an unexpected scientific discovery when two stabilizers are found that will synergize with each other in poly-α-olefin compositions, there are certain practical commercial advantages that often times accompany the use of such combinations of stabilizers as distinguished from the use of a single stabilizer material or compound. For example, one of the stabilizers of the combination might be costly or difficult to acquire in commercial amounts while the other stabilizer of the combination might be relatively cheap and readily available. In such a situation it is desirable to be able to substitute the cheaper stabilizer for a portion of the more expensive stabilizer, and still be able to obtain good stabilization through the synergism of the stabilizer combination. Thus, it is highly desirable in the poly-α-olefin art to have available synergistic combinations of two or more stabilizers.

It is an object of this invention to provide a new synergistic combination of stabilizers for poly-α-olefin compositions.

It is another object of this invention to provide novel polyethylene and polypropylene compositions containing a synergistic combination of compounds that improves the stability of the polyethylene and polypropylene compositions against deterioration resulting from exposure to sunlight or ultraviolet light.

It is also an object of this invention to provide novel poly-α-olefin compositions of improved stability in thin film form.

Other objects of the invention will be apparent from the description and claims that follow.

The present invention comprises poly-α-olefin compositions having incorporated therein a stabilizer combination comprising resorcinol monobenzoate and 2,2'-methylenebis(6-tertiarybutyl-p-cresol). This combination of stabilizers imparts to poly-α-olefin compositions a high degree of stability to deteriorations resulting from exposure to ultraviolet light, and which improved stability is substantially greater than the additive effect of the individual stabilizers comprising the subject stabilizer combination. Hence, the stabilizer combination of the invention is termed in the art a "synergistic" combination.

The resorcinol monobenzoate component of the subject stabilizer combination is a well-known compound having the following formula:

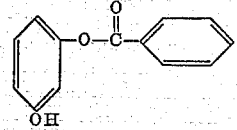

The 2,2'-methylenebis(6-tertiary-butyl-p-cresol) component of the subject stabilizer combination is likewise a well-known compound having the following formula:

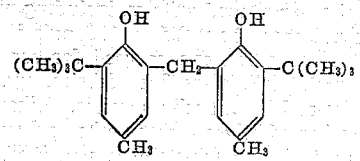

The combination of resorcinol monobenzoate and 2,2'-methylenebis(6-tertiary-butyl-p-cresol) can be used to stabilize a wide variety of poly-α-olefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizer combination is preferably used in polyethylene and polypropylene, although such poly-α-olefins as poly 4-methylpentene-1, poly 3-methylbutene-1, poly 3,3-dimethyl-butene-1, poly pentene-1, and related homologues are included in the invention. Both the so-called "low density" and "high density" poly-α-olefin compositions can be stabilized in accordance with the invention. "Low density" polyethylene usually has a density of about .91 to .93 and "high density" polyethylene usually has a density of about .94 to .97, for example. Densities of other poly-α-olefins are known in the art. Reference is made to Fawcett et al. U.S. Patent No. 2,153,553 granted April 11, 1939, and to co-pending applications Coover U.S. Serial No. 559,536 filed January 17, 1956 and Coover et al. U.S. Serial No.

724,904 filed March 31, 1958, with regard to the preparation of various poly-α-olefin compositions that can be stabilized against ultraviolet deterioration with the subject stabilizer combination. The subject stabilizer combination can be used as an ultraviolet inhibitor for the more common solid resinous poly-α-olefin compositions having average molecular weights of at least 15,000 and more usually at least 20,000, as well as the so-called poly-α-olefin waxes having lower molecular weights such as 3,000 to 12,000.

The amount of the subject stabilizer combination employed in poly-α-olefin compositions in accordance with the invention can be widely varied, the stabilizing amount of this combination usually varying with the particular use to which the poly-α-olefin is to be put. Concentrations of the combination of at least .001% are used, with concentrations of .001% to 10% being generally used, and with concentrations of .005% to 5% being preferably used, the concentration being based on the weight of the poly-α-olefin. The weight ratios of the two stabilizers comprising the subject synergistic combination likewise can be varied. We generally utilize the combination of the subject two stabilizers at a weight ratio of resorcinol monobenzoate to 2,2'-methylenebis(6-tertiary-butyl-p-cresol) in the range of 1/30 to 30/1, and preferably 1/10 to 10/1.

The stabilizer combination of the invention can be incorporated or blended into poly-α-olefin compositions by any of the conventional methods used for blending such materials into polymers, resins or plastics. Typical of such methods that can be suitably employed include milling on heated rolls, deposition from solvents and dry-blending. The stabilizers of the invention can be incorporated separately or together into the poly-α-olefin composition.

The stabilizer combination of the present invention lends to poly-α-olefin compositions improved stability, and more specifically, improved stability against deterioration resulting from exposure to sunlight or ultraviolet light. Thus, poly-α-olefins stabilized in accordance with the invention have an extended life expectancy and can be used more effectively than unstabilized poly-α-olefins for a wide diversity of uses, including outdoor uses requiring prolonged exposure to the elements. Poly-α-olefins stabilized in accordance with the invention can be cast, extruded, rolled or molded into sheets, rods, tubes, piping, filaments and other shaped aritcles, including widely used films of the polymer about 0.5 to 100 mils in thickness. The present composition can be used for coating paper, cloth, wire, metal foil, glass fiber fabrics, synthetic and natural textiles and other such materials. Likewise, small amounts of other additives such as other polymers, resins or plastics, as well as other stabilizers or inhibitors, that are commonly added to poly-α-olefins for specific uses are not deleterious to the effectiveness of the present synergistic combination.

The invention is illustrated by the following examples of preferred embodiments thereof.

EXAMPLE 1

Polyethylene samples containing 1% by weight of resorcinol monobenzoate plus .5 by weight of 2,2'-methylenebis(6-tertiary-butyl-p-cresol), as well as these two stabilizers individually and a control containing no stabilizer additive for comparative purposes, were subjected to an outdoor weathering test. The various additives were incorporated into polyethylene having an average molecular weight of about 30,000 and a density of 0.918 by milling on heated rollers in accordance with usual practice. Thereafter the polyethylene was compression molded into films about 60 mils in thickness. Samples of the resulting films containing the various additives and the control sample containing no additive were exposed to outdoor weathering on a rack facing south at an angle with the horizontal of 36.5° at Kingsport, Tennessee for 14 months. The exposed samples were tested for deterioration resulting from the weathering by elongation measurements of 2.5 x .5 inch test strips on an Instron Tensile Tester at a rate of stretch of 2,000% per minute. The test samples were conditioned one week at 73° F. at a relative humidity of 50%. The results of the tests are summarized by the data set out in the table below.

Table

| Additive | Percent Original Elongation Retained After 14 Months of Exposure |
| --- | --- |
| (1) None | 9 |
| (2) .5% 2,2'-Methylenebis(6-tert.-butyl-p-cresol) | 10 |
| (3) 1% Resorcinol monobenzoate | 34 |
| (4) .5% 2,2'-Methylenebis(6-tert.-butyl-p-cresol)+1% resorcinol monobenzoate | 64 |

As evidenced by the elongation measurements described above, 2,2'-methylenebis(6-tertiary-butyl-p-cresol) and resorcinol monobenzoate cooperate in poly-α-olefin compositions to produce a synergistic stabilizing effect.

EXAMPLE 2

A .5% by weight portion of 2,2'-methylenebis(6-tertiary-butyl-p-cresol) in combination with a 1% by weight portion of resorcinol monobenzoate incorporated into polypropylene having an average molecular weight of about 110,000 and a density of 0.917, when prepared in test samples and exposed to weathering as described in Example 1, show a synergistic effect in stabilizing the polypropylene against deterioration resulting from the exposure.

The present invention thus provides novel poly-α-olefin compositions having improved stability against deterioration resulting from exposure to ultraviolet light, and particularly it provides novel synergistic stabilizer combinations for poly-α-olefin compositions.

Although the invention has been described in detail with reference to preferred embodiments thereof, it will be understood that variations and modifications can be effected within the spirit and scope of the invention as described hereinabove and as defined by the appended claims.

We claim:

1. A solid poly-α-olefin composition comprising a poly-α-olefin selected from the group consisting of polyethylene and polypropylene containing .001% to 10% by weight based on said poly-α-olefin of a stabilizer combination comprising resorcinol monobenzoate and 2,2'-methylenebis(6-tertiary-butyl-p-cresol), the weight ratio of said resorcinol monobenzoate to said 2,2'-methylenebis(6-tertiary-butyl-p-cresol) being in the range of 1/30 to 30/1.

2. A solid poly-α-olefin composition comprising polyethylene containing .001% to 10% by weight based on said polyethylene of a stabilizer combination comprising resorcinol monobenzoate and 2,2'-methylenebis(6-tertiary-butyl-p-cresol), the weight ratio of said resorcinol monobenzoate to said 2,2'-methylenebis(6-tertiary-butyl-p-cresol) being in the range of 1/30 to 30/1.

3. A solid poly-α-olefin composition comprising polypropylene containing .001% to 10% by weight based on said polypropylene of a stabilizer combination comprising resorcinol monobenzoate and 2,2'-methylenebis(6-tertiary-butyl-p-cresol), the weight ratio of said resorcinol monobenzoate to said 2,2'-methylenebis(6-tertiary-butyl-p-cresol) being in the range of 1/30 to 30/1.

4. A solid poly-α-olefin composition in film form .5 to 100 mils in thickness comprising polyethylene having an average molecular weight of at least 15,000 and containing .005% to 5% by weight based on said polyethylene of a stabilizer combination comprising resorcinol monobenzoate and 2,2'-methylenebis(6-tertiary-butyl-p-cresol), the weight ratio of said resorcinol monobenzoate to said 2,2'-methylenebis(6-tertiary-butyl-p-cresol) being in the range of 1/10 to 10/1.

5. A solid poly-α-olefin composition in film form .5 to 100 mils in thickness comprising polypropylene having an average molecular weight of at least 15,000 and containing .005% to 5% by weight based on said polypropylene of a stabilizer combination comprising resorcinol monobenzoate and 2,2'-methylbenebis(6-tertiary-butyl-p-cresol), the weight ratio of said resorcinol monobenzoate to said 2,2'-methylenebis(6-tertiary-butyl-p-cresol) being in the range of 1/10 to 10/1.

References Cited in the file of this patent

UNITED STATES PATENTS

| | | |
|---|---|---|
| 2,345,006 | Ross et al. | Mar. 28, 1944 |
| 2,675,366 | Pullman | Apr. 13, 1954 |
| 2,693,492 | Hoch | Nov. 2, 1954 |
| 2,835,649 | Nicholson et al. | May 20, 1958 |